Dec. 6, 1966 F. M. HAYDEN ETAL 3,290,602

REMOTE CONTROL TV TUNER

Original Filed Oct. 27, 1961

2 Sheets-Sheet 1

INVENTORS:
Fred M. Hayden
Orris K. Paddock

By Smyth, Roston & Pavitt

Attorneys.

REMOTE CONTROL TV TUNER

Original Filed Oct. 27, 1961

2 Sheets-Sheet 2

INVENTORS:
Fred M. Hayden
Orris K. Paddock

By Smyth, Roston & Pavitt
Attorneys

United States Patent Office 3,290,602

Patented Dec. 6, 1966

3,290,602
REMOTE CONTROL TV TUNER

Fred M. Hayden, Sherman Oaks, and Orris K. Paddock, Pacific Palisades, Calif., assignors to Packard-Bell Electronics Corporation, Los Angeles, Calif., a corporation of California Continuation of application Ser. No. 148,118, Oct. 27, 1961. This application Aug. 19, 1965, Ser. No. 484,782
14 Claims. (Cl. 325—393)

Figure 1:
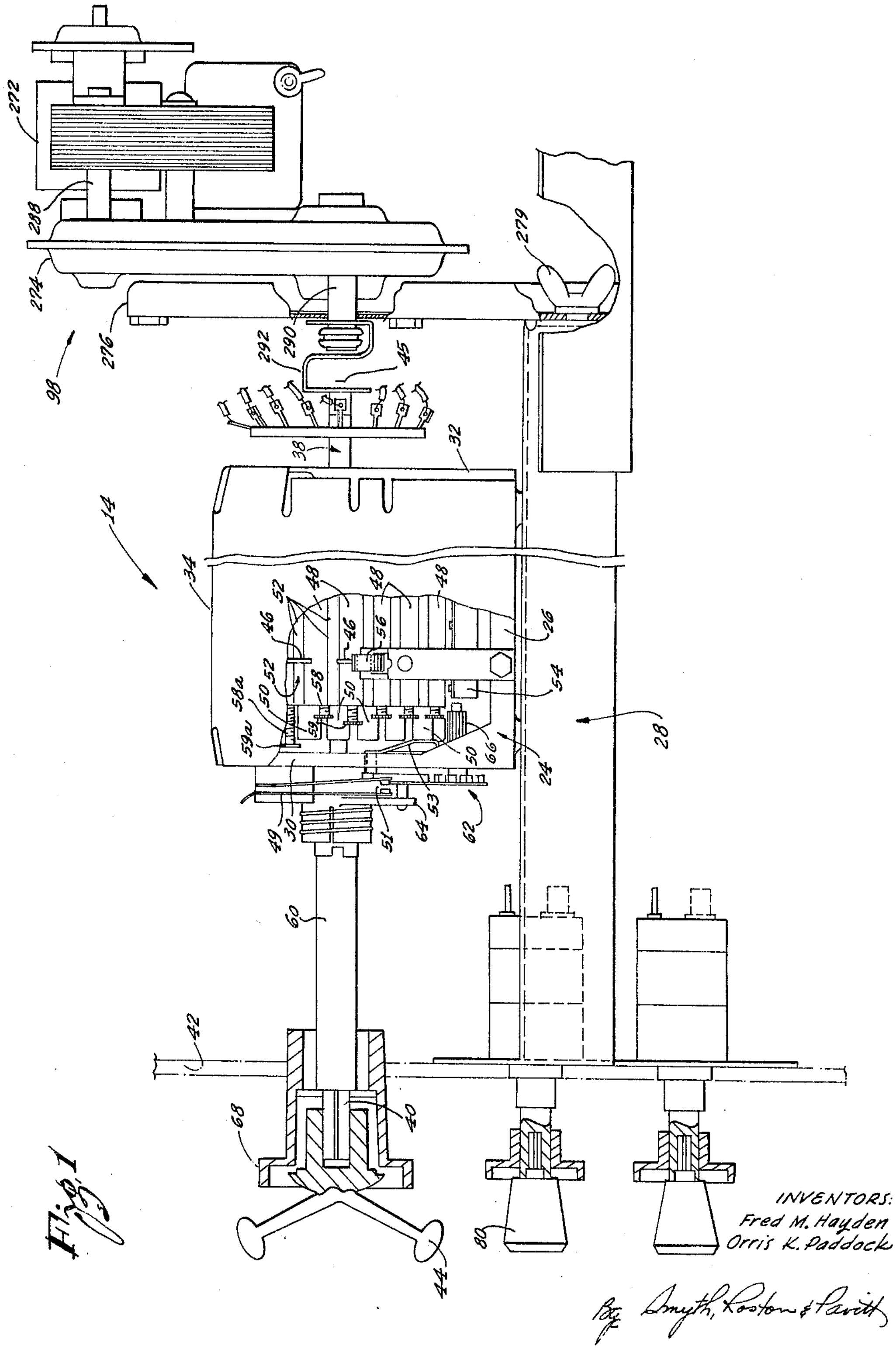

This is a continuation of our copending application Serial No. 148,118, filed October 27, 1961, now abandoned and entitled "Control Means."

The present invention relates to new and improved television receivers and more particularly to means for controlling the operation of a television receiver.

At the present time, television receivers that are mass produced for distribution to the general public are normally originally equipped with a manually operated control system or a remotely operated control system. In the manually operated control system, the television receiver may be provided with a plurality of control knobs that are actuated by an operator disposed adjacent the receiver. One of these control knobs may be effective to adjust a tuner so as to position a preselected coil means in position to simultaneously tune both the audio and video portions of the receiver to the desired station or channel. Another of the control knobs may be effective to adjust a volume control in the audio portion to thereby vary the volume of the sound from the receiver. Since these control knobs are all mounted on the receiver and since they must be manually manipulated, the operator cannot remain in a normal viewing location while making adjustments to the receiver.

In the so-called remotely controlled type of television receiver, a control unit is provided in the television receiver for adjusting the receiver in response to suitable control signals. This control unit may include suitable means to vary the resistance of a volume control in the audio circuit and/or means for adjusting tuning coil means. An operator having means for transmitting suitable command signals may thus cause a television receiver equipped with a remote control unit to adjust itself to any desired station and volume even though the operator is disposed a considerable distance from the receiver.

In order to convert a television receiver that was originally only manually adjustable to a remotely adjustable receiver, it is necessary to add a suitable control unit for receiving the command signals and motor means for adjusting the volume control and tuning coil means in response to the command signals. Since various portions of the control unit must be operatively interconnected with the electronic circuitry of the receiver and since the motor means must be mechanically interconnected with the various controls in the television receiver, it has been extremely difficult if not impossible to modify or adapt a manually controlled receiver to a remotely controlled receiver. Heretofore, in order to convert a manually controlled television receiver to a remotely controlled receiver, it has required extensive changes in the electronic circuitry of the receiver and an accurate mounting and aligning of the various elements such as the drive shaft of the motor and the shaft of the tuner. As a result, such conversions have required the services of a highly skilled person for a considerable period of time. In addition, the results of the conversions have frequently been incapable of properly adjusting the various controls. For example, it has been virtually impossible to accurately align the drive shaft from the motor with the tuner shaft. Also it has been very difficult for the subsequently added control unit to accurately sense the position of the shaft in the tuner. Consequently the control means has not been able to control the motor means to cause an accurate indexing of the coil means during a tuning operation. Accordingly, as a practical manner, there have been no television receivers available heretofore wherein it was possible to convert the receiver from manual to remote control.

It is now proposed to provide a television receiver that will overcome the foregoing difficulties. More particularly, it is proposed to provide a television receiver suitable for mass production that may be originally manufactured as either a manually or a remotely controllable receiver and if originally built as a manually controllable unit it may be quickly and economically converted to a remotely controllable unit that will accurately adjust the receiver in response to command signals.

This is to be accomplished by providing a television receiver having a tuner of the so-called turret type wherein a program switch is integrally formed thereon so as to be actuated as the various coil means move into and out of tuning position. In addition, means are provided so that drive motor means may be mounted on the tuner whereby the drive shaft therefrom will be aligned with the tuner shaft. Thus a lost motion coupling may interconnect the two shafts with each other while permitting a predetermined amount of relative movement between the shafts. The control unit which is responsive to the command signals may be interconnected with the program switch, the television receiver and the drive motor means so as to actuate the drive motor means. Since the program switch is built into the tuner at the time of manufacture so as to be an integral part thereof, it will accurately sense the position of the tuning coil means in the tuner. Thus the drive motor means will be controlled so as to accurately index the coil means even though the lost motion coupling permits a large amount of misalignment and lost motion between the drive motor and the tuning shaft. This in turn not only reduces the accuracy required while mounting the various portions of the control unit by an amount that makes the conversion a simple and quick task for even an inexperienced person but it also greatly simplifies the remotely controlled tuning operation and the accuracy thereof.

Figure 2:
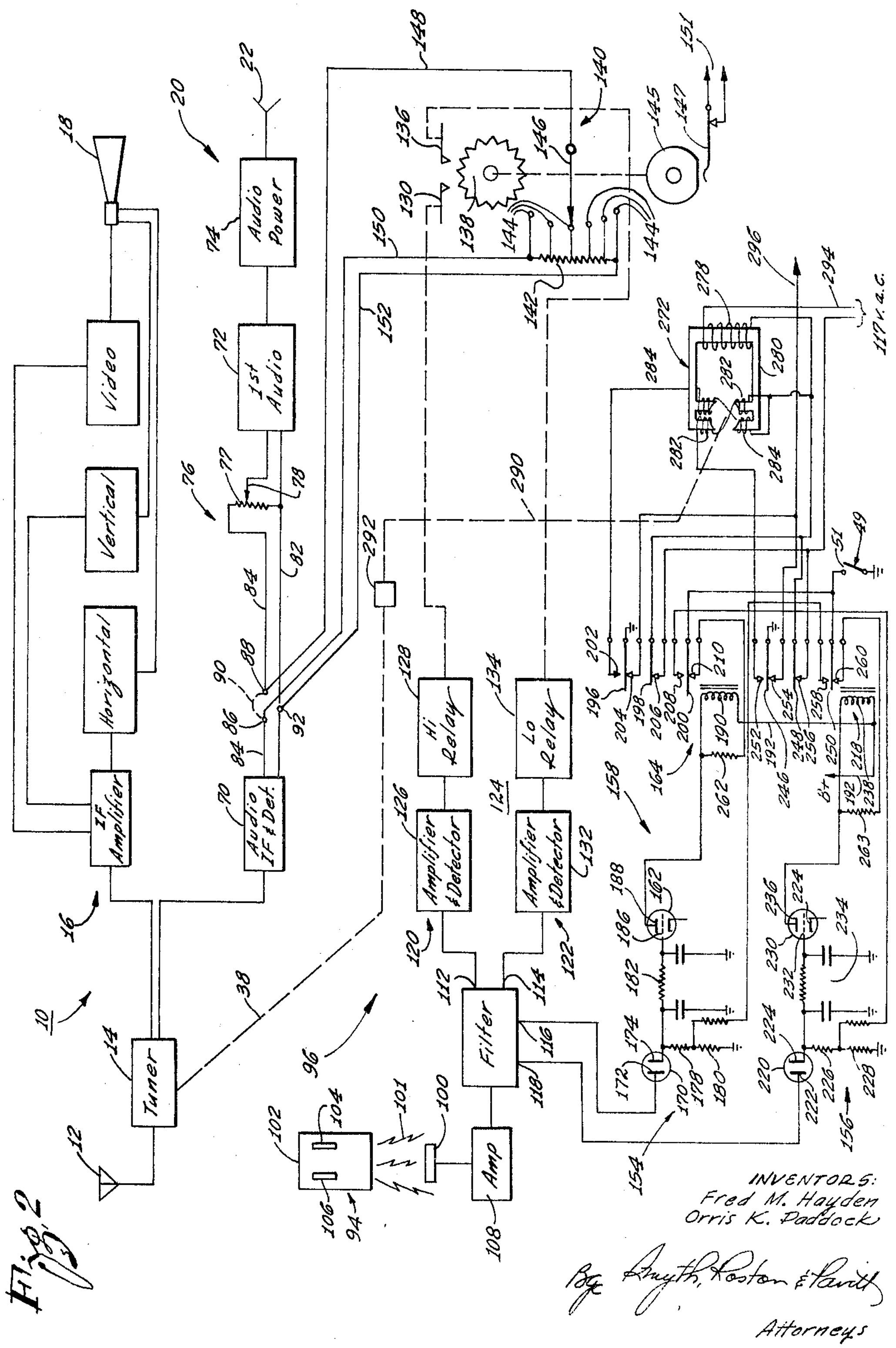

These and other features and advantages of the present invention will become more apparent from the following detailed description, particularly when taken in connection with the accompanying drawings wherein like reference numerals indicate like parts and wherein:

FIGURE 1 is a side elevational view of a television tuner and drive motor means therefor suitable for use with the television receiver of FIGURE 2; and FIGURE 2 is a diagram of a television receiver embodying one form of the present invention.

Referring to the drawings in more detail, the present invention is particularly adapted to be embodied in a television receiver 10 which may be connected to an antenna 12 for receiving electromagnetic signals. The input to the receiver 10 may include a tuner 14 that has a plurality of coil means that are tuned to the frequencies of the various stations which are to be received with the antenna 12. The tuner 14 may be interconnected with a video portion 16 that will be effective to energize a picture tube 18 whereby a visual picture will be formed on the face of the tube 18. In addition, an audio portion 20 may be provided that will excite a loudspeaker 22 so as to produce sound for accompanying the picture.

The tuner 14 which in the present instance is of the so-called turret type includes a frame 24 having a base 26 that is secured to one of the chassis 28 in the television receiver 10. The frame 24 includes a pair of end members 30–32 that project upwardly from the opposite ends of the base 26. A cover 34 may be secured to the end members 30 and 32 so as to form an enclosed space.

A pair of aligned openings may be provided in each of the ends 30 and 32 for rotatably supporting a tuning shaft 38. The shaft 38 is preferably much longer than the base 26 so that the ends thereof will project beyond both of the end walls 30–32. The front end 40 of the shaft 38 extends beyond a control panel 42 for the receiver 10 and has a control knob 44 secured thereto. Thus, an operator standing adjacent the control panel 42 may manually rotate the tuner shaft 38. The rear end 45 of the shaft 38 preferably extends beyond the rear wall 32 so as to terminate approximately directly above the rear end of the chassis 28.

A front and a rear support may be secured to the portion of the shaft 38 located between the two end walls 30 and 32 so that the coil means may be secured thereto. The supports may be welded or otherwise rigidly secured to the shaft 38 so as to rotate therewith. The front support may include a plurality of fingers 46 that project radially outwardly from the periphery of the member at circumferentially equally spaced intervals. The outer ends of the fingers 46 are spaced from each other and are adapted to have the coil means disposed therebetween. Each of the coil means includes a rigid member 48 that has the front end thereof disposed between the adjacent ends of the fingers 46. The rear ends of the rigid members 48 may be secured to the rear support member. Thus, the rigid members 48 will all be disposed parallel to and concentric about the shaft 38 in a generally drum-like configuration.

Each of the rigid members 48 may have a set of coils disposed on the inside thereof which are interconnected with electrical contact points 52 on the outside of the rigid members 48. These contacts 52 are adapted to engage a set of complementary contacts on a fixed member 54. The contacts on the member 54 are in turn interconnected with the video and audio portions 16 and 20 of the receiver 10. Thus, the contacts 52 on each of the members 48 may individually be selectively placed in a predetermined position so as to be interconnected with the fixed contacts whereby the coil means will be interconnected with the audio and video portions of the receiver 10. A roller detent 56 may be provided for engaging the outer ends of the finger 46 so as to retain the rigid members 48 in the preselected positions.

In addition, a hub may be rigidly mounted on the front support so as to rotate with the support whenever it turns. This hub includes a separate detent 50 for each of the rigid members 48 that project forwardly toward the front end wall 30. A program switch 49 may be mounted on the front member 30 so that the contacts 51 will normally be open. One of the arms 53 carrying a contact may extend through the wall member 30 and terminate adjacent the detents 50. When the roller detent 56 is retaining the coil means in an operative position the end of the arm 53 will be disposed between the detents 50 so as to permit the contacts 51 to be open. However, as soon as the shaft 38 rotates to move the coil means one of the detents 50 will engage the arm 53 and retain the contacts 51 closed. When the shaft 38 has rotated the next coil means approximately into position and the action of the roller detent 56 on the ends of the fingers 46 is sufficient to insure the exact positioning of the coil means, the arm 53 will disengage the detents 50 and allow the contacts 51 to open.

Each of the coil means may be pre-tuned to the frequencies of one of the stations to be received. Thus, if the shaft 38 is rotated to move into some angular position, a preselected coil means will be placed in electrical engagement with the fixed contacts on member 54 and the audio and video portions of the receiver 10 will be tuned to a station. Although the various coils are all pretuned to the frequencies of preselected stations, means may be provided for fine tuning the coils after they are in use in the receiver 10. In the present instance, this means includes tuning screws 58 that are mounted on the rigid members 48 so that rotation thereof will move tuning slugs axially through one or more of the coils. The front ends or head 59 of each tuning screw 58 projects forwardly from the members 48 and includes a plurality of gear teeth.

In order to adjust the tuning screws, an outer sleeve 60 may be provided around the shaft 38 for driving a gear train 62 that is adapted to engage and drive the tuning screw 58 for the coil means in use. The end gear 66 of the gear train 62 is normally disengaged from heads 59 of the tuning screw 58. However, the gear train 62 is carried on a reaction member 64 that is frictionally connected to the shaft 60. This member 64 will move end gear 66 of the train 62 against the end of the tuning screw 58 whenever the shaft 60 is rotated. Thus, an operator by manually tuning the control knob 68 may fine tune the coil means for each station. When one of the coil means is tuned to a frequency upon which no station can be received, the tuning screw 58 may be rotated into a fully extended position similar to screw 58A. This will cause the head 59A to engage the arm 53 when the coil means is in the operative position. As a result, the switch 49 will have the contacts 51 retained closed even though the arm 53 is between detents 50.

The audio portion 20 of the receiver 10 may include various stages such as an intermediate frequency amplifier and detector 70, an audio amplifier 72 and an audio power amplifier 74 for exciting the loudspeaker 22. One of the stages or the coupling therebetween may include a suitable volume control 76. In the present instance, this volume control 76 includes a potentiometer 77 having a movable center contact 78 that is electrically interconnected with the input to the next stage and is mechanically interconnected with a control knob 80 projecting from the control panel 42. The lower end of the potentiometer 77 may be electrically connected to a ground conductor 82 which extends between the adjacent stages. The upper end of the potentiometer 77 may be electrically connected to a conductor 84 that leads to the output from the preceding stage.

The conductor 84 preferably has a pair of contacts 86 and 88 which are arranged to have an electrically conductive jumper 90 removably connected therebetween. These contacts 86 and 88 together with a similar contact 92 in the conductor 82 are preferably arranged to form a three element socket that is mounted on the receiver 10 in a location that is readily accessible.

It may thus be seen that an operator desiring to view a program on the television receiver 10, may manually rotate the control knob 44 on the end of the tuner shaft 38. This will cause the shaft 38 to rotate and carry therewith the various coil means. When the coil means for the required station is positioned so that the contacts 52 thereon engage the fixed contacts on the member 54, further rotation of the shaft 38 may be stopped. At this point, the roller detent 56 will engage the ends of the fingers 46 and thereby retain the coil means properly positioned for the contacts 52 thereon to be in contact with the fixed contacts. Thus, both the video and audio portions 16 and 20 respectively of the receiver 10 will be tuned to the desired station.

In the event additional tuning or more accurate tuning is required for the video portion, the control knob 68 on the end of the outer shaft 60 may be rotated. When this occurs, the outer shaft 60 will rotate and cause the reaction member 64 which is frictionally secured to the shaft 60 to rotate therewith and move the gear train 62 so that the end gear 66 thereof will engage the head 59 of the fine tuning screw 58. Further rotation will cause the gear 66 to rotate the screw 58 and thereby fine tune the coil to the exact frequency desired.

In order to vary the intensity of the sound, the operator may manually turn the volume control knob 80.

This will move the center tap 78 along the potentiometer. Since the center tap 78 will act as a voltage divider, when the tap 78 is disposed adjacent the lower end the volume will be low but when the tap 78 is adjacent the upper end the volume will be a maximum.

Although a television receiver of the foregoing nature may be easily adjusted by the operator manually turning the various control knobs 44, 68 and 80 projecting from the control panel 42, in order to do so it is necessary for the operator to be within reach of the receiver 10. Accordingly, it may be desirable to provide a remote control system whereby the receiver 10 may be adjusted by an operator while he is located at a normal viewing location even though this is at a substantial distance from the receiver 10. Therefore, at the time the receiver 10 is originally manufactured, or subsequently thereto, a remote control unit 94 may be provided.

The present control unit 94 includes a remote control receiver 96 and electrical drive motor means 98. The remote control receiver 96 is preferably assembled on a separate chassis so as to be a self contained unit. Thus, in the event the receiver as originally manufactured is to be remotely controlled or if it is desired to convert a manually controlled receiver to a remotely controlled unit, the chassis may be easily mounted in the receiver 10. The input to the receiver 96 includes a transducer 100 for sensing command signals. Although the command signals for controlling the receiver may be of any suitable variety, for purposes of illustration, they may be so-called supersonic signals 101 having frequencies in a range of about 30 to 40 kilocycles per second. Thus, the transducer 100 may be a device such as a microphone capable of receiving supersonic signals radiated from a transmitter.

The present transmitter 102 is adapted to be held in the operator's hand and includes a volume control 104 and a station control 106. When the operator manipulates one of these controls 104 or 106, it may cause a tuning rod or similar device to be struck whereby it will vibrate for a short interval and radiate a short pulse of supersonic vibrations 101. The volume control 104 may be effective to cause radiation of a signal of a first frequency for increasing the volume or a signal of a second frequency for decreasing the volume. Similarly, the station control 106 may be effective to cause radiation of a signal of a third frequency for increasing the frequency of the station being received or a signal of a fourth frequency for decreasing the frequency of the station being received.

The transducer 100 when subjected to a command signal will provide an electrical signal that will be a pulse of substantially identical frequency and time duration. The transducer 100 is interconnected with the input to an amplifier 108 that will be effective to amplify the pulse to a more useful level. The output of the amplifier 108 may include or be interconnected with filter means having two pairs of outputs. The first pair of outputs 112–114 will provide pulses of the first and second frequencies respectively corresponding to those produced by the volume control 104. The first or higher volume pulse will be present on output 112 while the second or lower volume pulse will be present on output 114. The second pair of outputs 116–118 will provide pulses of the third and fourth frequencies corresponding to those produced by the station control 106. The third or increase frequency pulse will be present on the output 116 while the fourth or decrease frequency pulse will be present on the output 118.

The first pair of outputs 112 and 114 are interconnected with inputs to high and low branches 120 and 122 respectively of an audio portion 124 of the control receiver 96. The high branch 120 includes a detector-amplifier 126 and a relay 128. The detector-amplifier 126 includes a diode or similar device for detecting the pulse of the first frequency. This will provide a D.-C. pulse of the same time duration that will then be amplified to increase the amplitude thereof. This amplified D.-C. pulse may then be fed to the coil of the relay 128 so as to thereby momentarily energize the relay and actuate a one way ratchet drive 130.

The low branch 122 is substantially identical to the high branch 120 in that it also has a detector-amplifier 132 and a relay 134. Thus when a pulse of the second frequency is present on the output 114 it will be detected and amplified to provide a corresponding D.-C. pulse which in turn will be fed to the relay 134. This will then energize the relay 134 and actuate a second one way ratchet drive 136.

The ratchet drives 130 and 136 are positioned to engage the teeth of a cog wheel 138 in a stepping switch 140. Thus, a pulse in the high branch 120 will cause the ratchet drive to engage the wheel 138 and rotate it clockwise while a pulse in the low branch 122 will cause the wheel 138 to rotate counterclockwise. The wheel 138 is interconnected with a movable contact 146 that will move across the fixed contacts 144 and a cam wheel 145 that engages a switch 147. The switch 147 may be connected to a pair of wires 151 that are interconnected with the power line suppying power to the receiver 10. Thus, by rotating the cog wheel 132 until a flat spot on the cam wheel 145 permits the switch 147 to open, the receiver may be turned off.

The fixed contacts 144 may have a plurality of resistances 142 interconnected therewith to form a voltage dividing network. The contact 146 may be electrically connected to one end of conductor 148 while the upper end of the resistors 142 is connected to conductor 150 and the lower end is connected to conductor 152. These conductors 148, 150 and 152 may be arranged into a cable having jacks on the end thereof that are adapted to be plugged into the contacts 86, 88 and 92 after the jumper 90 is removed.

It may thus be seen that if the jumper 90 is removed, the resistors 142 and the movable contact 146 will act as a voltage divider that is in series with the volume control 76. As a consequence, the overall gain of the audio portion 20 will have a maximum determined by the setting of the volume control 76 and will be a percentage of this maximum as determined by the setting of the contact 146.

The second pair of outputs 116–118 are interconnected with inputs to the high and low branches 154 and 156 respectively of a video portion 158 of the control receiver 96 that are effective to control the operation of the drive motor means. The drive motor means 98 includes a reversible electric motor 272 which is secured to a housing 274 for a reduction gear train. The housing 274 is in turn secured to a mounting bracket 276 that may be secured to the end of the chassis 28 by means of fastening means. To facilitate the installation of the drive motor means 98 the fastening means are preferably wing nuts 279.

The motor 272 is preferably of the so-called split phase variety wherein a power or primary winding 278 is provided that encompasses the entire stator 280. In addition, a forward winding 282 encompasses only a portion of the stator 280 while a reverse winding 284 encompasses only another portion of the stator 280. The rotor is mounted on an axially movable shaft 288 which is spring biased into an unclutched position. However, when the windings are energized, the shaft 288 will be magnetically biased into a clutched position so as to be connected to the gear train. The gear train includes an output shaft 290 which is positioned in substantial alignment with the shaft 38 but is spaced therefrom. The two shafts 38 and 290 are connected together by a coupling 292 that is a resilient member having oversized openings therein for receiving the ends of the shafts. Thus, if the shafts are not exactly aligned the coupling will permit a predetermined amount of relative movement therebetween.

The high branch 154 includes a detector-amplifier 158 and a relay 164. The detector-amplifier 158 comprises a diode 170 with the plate 172 thereof connected to the output 116 and the cathode 174 thereof connected to ground by a pair of voltage dividing resistors 178 and 180. The cathode 174 may also be coupled to a vacuum tube 162 by means of filter network 182.

The vacuum tube 162 which has the control grid 186 connected to the filter network 182 has a plate 188 connected to one side of a coil 190 in the relay 164. The opposite side of the coil 190 is connected to a conductor 192 leading to a high voltage D.-C. source. The relay 164 includes an armature that is normally in an upper position so that it will be pulled down when the coil 190 has a sufficiently large current therethrough. The armature includes three movable contacts 196, 198 and 200 and fixed contacts 202, 204, 206, 208 and 210.

It may be seen that when a pulse of the third frequency is present at the output 116, the diode 170 will conduct so as to produce a positive D.-C. pulse across the resistors 178 and 180. This positive pulse will pass through the network 182 to the control grid 186 and drive it more positive. This in turn will cause the plate current in the tube 162 to increase sufficiently for the coil 190 to pull the armature down thereby opening the contacts 202 and 208 and closing the contacts 204, 206 and 210.

The low branch 156 is similar to the high branch 154 in that it also includes a detector-amplifier and a relay 218. The detector-amplifier includes a diode 220 having a plate 222 connected to the filter output 118 and a cathode 224 connected to a voltage dividing resistors 226 and 228. A vacuum tube 230 has a control grid 232 coupled to the cathode 224 by a coupling network 234. The plate 236 is connected to one side of a coil 238 in the relay 218. The opposite side of the coil 238 is connected to the conductor 192. The coil 238 is adapted to pull the armature down when it is energized and cause the three movable contacts 246, 248 and 250 to move away from the fixed contacts 252 and 258 and against the fixed contacts 254, 256 and 260.

It may thus be seen that when a pulse of the fourth frequency is present at the output 118, the diode 220 will conduct so as to produce a positive D.-C. pulse across the resistors 226 and 228. This positive pulse will cause the tube 230 to energize the coil 238 and pull the armature down.

The top contact 202 is connected to reverse winding 284 while the top contact 252 is connected to the forward winding 282. The contacts 204 and 254 are connected together and to a conductor 296 leading to the audio portion 20 so as to disable the audio portion 20 and prevent any sound from the speaker 22 when either relay 164 or 218 is energized. The movable contacts 196 and 246 are both connected to ground.

The movable contacts 198 and 248 and fixed contacts 206 and 256 are interconnected with a power line 294 for the motor 272 to thereby form a pair of parallel on-off switches.

The bottom contact 210 of the relay 164 is connected to a load resistor 262 which is connected to the upper end of the coil 190. Similarly, the bottom fixed contact 260 of relay 218 is connected to the upper end of the coil 238 by means of a load resistor 263. The fixed contact 208 is interconnected to the junction between the voltage dividing resistors 226 and 228 while the fixed contact 258 is connected to the junction between the voltage dividing resistors 178 and 180. The program switch 49 has one of the contacts 51 connected to ground while the other contact 51 is connected to the movable contacts 200 and 250.

It may thus be seen that when a signal reaches diode 170, a positive pulse will appear across the resistors 178 and 180. This will cause the tube 162 to energize the coil 190 and pull the armature down whereby the contacts 196, 198 and 200 will engage the contacts 204, 206 and 210. Thus, the conductor 296 will be grounded so as to silence the audio portion 20. At the same time, the contacts 198 and 206 will connect the winding 278 to the power line. The forward winding 282 will then be grounded through the contacts 246 and 252 and the motor will start running in the forward direction. At the same time, the contact 200 will engage the contact 210 and complete a circuit from the ground through the resistor 180, the contacts 258 and 250 to the contacts 200 and 210, a load resistor 262 and coil 190 and the high voltage line 192.

Thus, even through the positive pulse has disappeared from the resistors 178 and 180 there will be sufficient current through the resistor 180 to keep the tube 162 biased in a conductive state. Thus, the coil 190 will be energized and the armature depressed. As soon as the motor 272 commences running in a forward direction, the shaft 38 will rotate and carry the coil means and detents 50 therewith. As soon as the shaft 38 has rotated a small amount, for example, about six to twelve degrees, one of detents 50 will engage the arm 53 of the program switch 49 and close contacts 51. When these contacts 51 close, contacts 200 and 210 will be grounded and the coil 190 will be maintained energized. Since the potential across the resistor 180 will be shorted to ground the tube 162 will not conduct. When the shaft 28 has rotated far enough for the program switch 49 to open, the coil 190 will be de-energized so as to release the armature. This will cause contacts 196–204, 198–206 and 200–210 to separate and the motor 272 to stop.

It should be noted that normally the arm 53 will be released by the detents 50 when one of the coil means is in an operative position. However, if the coil means that is in an operative position has the tuning screw 58A in an extended position, the head 59A thereof will engage the arm 53 and keep the contacts 51 closed even though one of the coil means is in an operative position. Thus, the motor 272 will continue to run until the next coil means with a retracted tuning screw is indexed into an operative position.

In the event a signal reaches the diode 220 a positive pulse will appear across the resistors 226 and 228. This will cause the tube 230 to energize the coil 238 in relay 218 and pull the armature down. This will cause the contacts 246, 248 and 250 to engage the contacts 254, 256 and 260 respectively. As a result, the winding 278 and the reverse winding 284 will be energized so as to cause the motor 272 to run in reverse and rotate the shaft 38 in the opposite direction from before. Even though the positive pulse produced by the command signal has disappeared current will flow through the resistor 228, contacts 208–200, to contacts 250–260, load resistor 263, coil 238 to the line 192 as well as tube 230 whereby the relay will be held energized. However, as soon as the shaft 38 rotates enough to close the program switch contacts 51, the resistor 228 will be shortened to ground but the relay 218 will still be held energized. Thus, the motor 272 will continue to run until the shaft 38 has rotated far enough for the contacts 51 to open. When this occurs the detent means 56 will insure a coil means being operatively interconnected with the video and audio portions 16 and 20.

It may thus be seen that the television receiver 10 may be originally equipped with a remote control unit 94 and a drive motor means 98 or the receiver 10 may be free of the unit 94 and motor means 98. In the event the receiver 10 is manually controlled and it is to be converted to a remotely controlled receiver, the control receiver 96 may be mounted in previously provided space inside of the cabinet for the receiver 10. The motor means 98 may then be secured to the chassis 28 by tightening the wing nuts 279. At the same time the coupling 292 may interconnect the shafts 38 and 290. Although it is desirable for the shafts to be accurately aligned, the coupling 292 and the lost motion provided thereby will be adequate to accommodate any misalignment that may occur as a result of normal production tolerance occurring in the production of the various parts. Following this the jumper 90 may be removed and the conductors 148, 150 and 152 may be connected to the contacts 86, 88 and 92. In addition, the various other conductors such as those leading to the switch 49 and the various voltage sources may then be plugged in and the manually controlled receiver will have been converted to a remotely controlled unit. Since the program switch 49 and the detents 50 are integral parts of the tuner 14, they will accurately sense the position of the coil means. Thus, the motor means 98 will accurately index the coil means even though there are some misalignments between the shafts 38 and 290 and some lost motion in the coupling 292.

It may thus be seen that a television receiver has been provided which may be originally manufactured as a remote control receiver or a manually controlled receiver and if it is originally manufactured as a manually controlled receiver, it may be readily connected to a remotely controlled receiver by even an inexperienced person. Although only a single embodiment of the present invention has been disclosed, it will be readily apparent to those skilled in the art that numerous changes and modifications may be made without departing from the spirit of the invention. Accordingly, the foregoing description and drawings are for illustrative purposes only and are not intended to limit the invention which is defined only by the claims which follow.

What is claimed is:

1. In combination for tuning a television receiver to any preselected channel in a group of channels in accordance with a command signal from a remote position, a chassis, a shaft rotatably mounted upon said chassis for rotation in forward and reverse directions, separate coil means for each channel in the group, said coil means being mounted on said shaft for rotation with said shaft into preselected positions so that only one of said coil means at a time is disposed in an operative position, an electric motor, means resiliently and detachably connecting said electric motor to said shaft for rotatably driving said shaft in the forward and reverse directions in accordance with the operation of the motor, mechanical detent means mounted upon said chassis and positioned to be operatively interconnected with said shaft to resiliently retain one of said coil means in said operative position, switch means mounted on said chassis and electrically interconnected with said motor and having open and closed relationships, means including detents electrically connecting said switch means and said motor for obtaining an energizing of the motor in the closed relationship of the switch means, said detents being positioned to engage and actuate said switch means to the closed relationships to maintain said motor energized whenever said coil means are not in one of said preselected positions, and a remote control receiver responsive to the command signal from the remote position for initially energizing the motor to obtain an initial rotation of the shaft in a particular one of the forward and reverse directions.

2. In combination for tuning a television receiver to any preselected channels in a group of channels, a chassis, a shaft rotatably mounted upon said chassis for rotation in forward and reverse directions, a separate coil means for each of the channels in said group, said separate coil means being mounted on said shaft substantially concentric with said shaft, said coil means being successively carried by said shaft into an operative position wherein only one of said coil means at a time is effective to tune said receiver in its respective channel, motor means, coupling means operatively and resiliently interconnecting said shaft with said motor means for rotatably driving said shaft in the forward and reverse directions in accordance with the operation of said motor means to move a preselected one of said coil means into said operative position, switch means having a first condition for obtaining an energizing of said motor to drive said shaft and said coil means and having a second condition to obtain a deenergizing of said motor, means including said switch means and said motor for energizing said motor in the first condition of the switch means, and a separate means carried by said shaft adjacent each of said coil means and being positioned to physically engage said switch means when there are no coil means in said operative position to maintain said switch means in said first condition and said motor energized and to obtain a rotation of said shaft until one of said coil means is rotated into said operative position.

3. In combination for tuning a television receiver to any preselected channel in a group of channels in response to a command signal from a remote position, a chassis, a shaft rotatably mounted upon said chassis for rotation in a forward and reverse directions, a separate coil means for each of the channels in said group, said separate coil means being disposed concentrically about said shaft at substantially uniformly spaced intervals for being successively carried one at a time into an operative position for successively tuning said receiver to said channels, an electric motor detachably mounted on said chassis, means resiliently and detachably interconnectig said motor with said shaft to rotatably drive said shaft in the forward and reverse directions in accordance with the operation of said motor and position a preselected one of said coil means in said operative position, first normally open switch means mounted on said chassis and having open and closed positions and being disposed in the closed position during the movement of the coil means toward the operative position and being disposed in the open position when the coil means is in the operative position, a plurality of detents carried by said shaft for rotating therewith, said detents being positioned to engage and close said first switch means whenever there are no coil means in said operative position, a control circuit including second switch means having open and closed positions and operatively interconnected with said motor to obtain an energizing of said motor to drive said shaft upon becoming closed, a self holding circuit operatively interconnected with said first and second switch means for retaining said second switch means closed upon the closing of the second switch means and during the closure of the first switch means, a remote control receiver operatively interconnected with said control circuit and responsive to the command signal from the remote position to close said second switch means, and means operatively interconnected with said first switch means and said holding circuit to disable said holding circuit whenever said first switch means is opened.

4. In a television receiver for obtaining the individual selection of stations in a plurality in accordance with a command signal from a remote position, a chassis, a shaft rotatably mounted upon said chassis for rotation in forward and reverse directions, a plurality of separate coil means carried by said shaft to operative positions, a motor detachably mounted on said chassis, resilient means detachably interconnecting said motor with said shaft to thereby rotate said shaft in the forward and reverse directions in accordance with the operation of the motor for moving said coil means into preselected positions so that only one of said coil means at a time is disposed in its operative position, normally open switch means mounted on said chassis, a plurality of means carried on said shaft and positioned to engage and close said switch means whenever said coil means are not in one of said preselected positions and to provide for the opening of the switch means when the switch means become disposed in one of the preselected positions, control circuit means operatively interconnected with said motor and said switch means to energize said motor to rotatably drive said shaft, self holding means in said control circuit effective to keep said motor energized, said switch means being electrically included in said holding means to maintain said holding means energized and to keep said motor energized when in the closed position and to disable said holding means upon being actuated to the open position, and a remote control receiver responsive to the command signal from the remote position for initially energizing the motor to obtain a rotation of the shaft in a particular one of the forward and reverse directions and a closing of the switch means.

5. In a television receiver responsive to the command signals from a position removed from the television receiver, a chassis, a shaft rotatably mounted upon said chassis for rotation in forward and reverse directions, support means secured to said shaft to rotate therewith, a plurality of separate coil means disposed on said support means for movement to operative positions, a motor detachably mounted on the chassis at a position for attachment to the chassis after the assembly of the television receiver, resilient means operatively interconnecting said motor with said shaft after the assembly of the television receiver for rotating said shaft in the forward and reverse directions in accordance with the operation of the motor and moving said coil means into their operative positions, switch means mounted on said chassis and physically positioned adjacent said support means and having open and closed positions, said switch means being electrically interconnected with said motor means and effective when closed to maintain said motor energized, a plurality of projections on said support means and positioned to engage and close said switch means whenever said coil means are not in their operative positions, remote control receiving means operatively interconnected with said motor means and responsive to the command signals for energizing said motor to rotate said shaft in a particular one of the forward and reverse directions a sufficient amount to close said switch means, a separate member for each of said coil means and carried with said support means adjacent said projections to engage and actuate said switch means into the open position when the coil means associated therewith is in said operative position.

6. In combination for tuning a television receiver to any preselected channel in a group of channels, a chassis, a shaft rotatably mounted upon said chassis for rotation in the forward and reverse directions, support means secured in said shaft to rotate therewith, a plurality of separate coil means disposed on said support means, each of said coil means being tuned to one of said channels and being rotatable to an operative position, a motor detachably mounted on said chassis, lost motion means detachably and resiliently interconnecting said motor with said shaft to rotate said shaft in the forward and reverse directions in accordance with the operation of the motor and move said coil means into a preselected position so that only one of said coil means at a time is disposed in its operative position, switch means mounted on said chassis adjacent said support means and having open and closed positions, circuitry means electrically interconnected with said switch means and said motor for energizing said motor in the closed position of the switch means, a plurality of detents on said support means and projecting outwardly therefrom for engaging and actuating said switch means to the closed position whenever at least one of said coil means is not in its operative position, and an adjustable member on each of said coil means projecting outwardly therefrom to engage and actuate said switch means to the open position only when the associated coil means is in said operative position.

7. In combination for tuning a television receiver to any preselected channel in a group of channels in accordance with a command signal from a remote position, a chassis, a shaft rotatably mounted upon said chassis, support means secured to said shaft to rotate therewith, a plurality of separate coil means disposed on said support means, each of said coil means being substantially tuned to one of said channels and being movable to an operative position, an electric motor detachably mounted on the chassis, lost motion means resiliently and detachably interconnecting said motor with said shaft for moving each of said coil means into the operative position to tune said receivers to a particular channel associated with that coil means, normally open switch means mounted on said chassis adjacent said support means, the switch means also having a closed position, a plurality of detents on said support means for engaging said switch means and retaining it in the closed position when the coil means are not in the operative positions, a tuning member reciprocably disposed in each of said coil means to be movable between a retracted position and an extended position to fine tune said coil means to a channel, each of said tuning members when in the extended position being effective to engage said switch means and retain said switch means open when the coil means associated therewith is in said operative position, control circuit means operatively interconnected with said motor for obtaining the operation of said motor in the closed position of the switch means, self holding means in said control circuit for keeping said motor energized, said switch means being disposed in said circuit and interconnected with said self holding means, said switch means when in the closed position being cooperative with said self holding means to maintain said motor energized, and remote control receiving means responsive to the command signal from the remote position for obtaining an initial energizing of the motor and a closing of the switch means upon the initial energizing of the motor.

8. In combination for tuning a television receiver to any preselected channel in a group of channels, a chassis, a shaft rotatably mounted upon said chassis for rotation in the forward and reverse directions, support means secured to said shaft to rotate therewith, a plurality of separate coil means disposed on said support means, each of said coil means being substantially tuned to one of said channels and being rotatable to an operative position, a motor detachably mounted on said chassis, lost motion means resiliently and detachably interconnecting said motor with said shaft to thereby rotate said shaft in the forward and reverse directions in accordance with the operation of the motor for moving said coil means into the operative position to tune said receiver to the particular channel associated with that coil means, normally open switch means mounted on said chassis adjacent said support means, said switch means also having a closed position, a plurality of detents on said support means for maintaining said switch means in the closed position whenever said coil means are not in said operative positions, a fine tuning member in each of said coil means and movable between a retracted position and an extended position to thereby fine tune at least a portion of said coil means to a particular channel, each of said members when in the fully extended position being disposed adjacent said detents to maintain said switch means in the closed position when the coil means associated therewith is in said operative position, control circuit means operatively interconnected with said motor to energize said motor for rotatably driving said shaft, self holding means in said circuit means to keep said motor energized whenever the motor is initially energized, said switch means being electrically interconnected with said motor and said self holding means to maintain said motor energized in the closed position and to disable said holding portion in the open position.

9. In a television receiver having a plurality of stations for controlling the selection of the stations in accordance with a command signal from a remote position, a tuner chassis, a first shaft rotatably mounted on said tuner chassis for rotation in the forward and reverse directions, a plurality of coil means mounted on said first shaft for rotating therewith, each of said coil means being tuned to a different one of the stations and being rotatable with said first shaft to an operative position, drive motor means detachably secured to said chassis and having a drive shaft disposed adjacent an end of said first shaft, lost motion coupling means resiliently and operatively interconnecting said first and drive shafts to obtain a transfer of torque from said drive shaft to said first shaft in the forward and reverse directions only after a predetermined amount of relative motion between said shafts and in accordance with the operation of the drive motor means, switch means disposed adjacent said support means and having open and closed positions, circuit means electrically connected with said drive motor means and said switch means for obtaining an operation of said drive motor means in the closed position of said switch means, a separate detent for each of said coil means and movable with said coil means for engaging and actuating said switch means to the closed position each time the coil means are not disposed in said preselected angular position, and remote control means responsive to the command signal from the remote position for initially energizing the drive motor means to drive the shaft in a particular one of the forward and reverse directions and to obtain an operation of the switch means to the closed position upon an initial energizing of the drive motor means.

10. In a television receiver having a plurality of stations for obtaining a selection of a particular one of the stations in accordance with a command signal from a remote position, a chassis, a tuner mounted on said chassis, a first shaft rotatably mounted on said tuner for rotation in first and second opposite directions, support means rigidly secured to said first shaft, a plurality of separate coil means secured to said support means, each of said coil means being tuned to a different one of the stations, said first shaft being rotatably mounted on said chassis to permit each of said coil means to be rotated into an operative position providing the selection of the associated station, a drive motor detachably secured to said chassis and having a drive shaft adjacent said first shaft, lost motion coupling means detachably and resiliently interconnecting said drive and first shafts for transferring torque from said drive shaft to said first shaft in the first and second opposite directions only after a predetermined amount of motion therebetween and in accordance with the operation of the drive motor, control circuit means responsive to the command signal from the remote position and operatively interconnected with said motor for initially obtaining the operation of the motor to obtain a rotation of the shaft in a particular one of the forward and reverse directions in accordance with the command signal, self holding means in said control circuit means for maintaining said motor energized upon an initial energizing of the motor, switch means having a normally open position and a closed position and mounted adjacent said support means and electrically interconnected with said control circuit means to disable said holding means and de-energize said motor in the open position, a separate detent on said support means for each of said coil means, said detents being positioned for closing said switch means whenever said coil means are disposed between said operative positions, and means for obtaining an operation of the switch means to the open position in the operative position of the coil means.

11. In a television receiver having a plurality of stations, a chassis, a tuner mounted on said chassis, a first shaft rotatably mounted on said tuner for rotation in first and second opposite directions, support means rigidly secured to the shaft to rotate therewith, a plurality of separate coil means secured to said support means, each of said coil means being tuned to a different one of the stations, said shaft being rotatably mounted on said chassis to permit each of said coil means to be rotated into an operative position providing a selection of the associated station, a drive motor secured to said chassis and having a drive shaft disposed adjacent said first shaft, lost motion coupling means resiliently and detachably interconnecting said first and drive shafts for transferring torque from said drive shaft to said first shaft in the first and second opposite directions only after a predetermined amount of angular motion therebetween and in accordance with the operation of the drive motor, switch means having open and closed positions and mounted adjacent said support means and electrically interconnected with said drive motor for providing the operation of said motor in the closed position of the switch means and for interrupting the operation of said motor in the open position of the switch means, fine tuning means on each of said coil means, each of said tuning means being movable between a retracted position and an extended position, said fine tuning means when in said retracted position being effective to tune its associated coil means without affecting the position of said switch means, said fine tuning means when in said extended position being effective to actuate said switch means whenever the coil means associated with said fine tuning means is disposed in said operative position, means for initially obtaining an energizing of the drive motor, and means operatively coupled to the switch means for obtaining an operation of the switch means to the open position in the operative position of the coil means.

12. In a television receiver having a plurality of stations, a chassis, a tuner mounted on said chassis, a first shaft rotatably mounted on said tuner for rotation in first and second opposite directions, support means rigidly secured to said first shaft to rotate therewith, a plurality of separate coil means secured to said support means, each of said coil means being tuned to a different one of the stations, said shaft being rotatably mounted on said chassis to permit each of said coil means to be rotated into an operative position providing the selection of the associated station, a drive motor detachably secured to said chassis and having a drive shaft disposed adjacent said first shaft, means resiliently and detachably coupling said drive shaft to said first shaft for transferring torque from said drive shaft to said first shaft in the first and second opposite directions only after a predetermined amount of angular motion therebetween and in accordance with the operation of the drive motor, control circuit means operatively interconnected with said motor for initially obtaining the operation of said motor means, self holding means in said control circuit means for maintaining said motor energized after the motor has been initially energized, switch means having a normally open position and a closed position and mounted adjacent said support means and electrically interconnected with said control circuit means, said switch means when in the closed position being effective to operate with said self holding means to energize said motor, a separate detent on said support means for each of said coil means, said detents being positioned for closing said switch means whenever said coil means are disposed between said operative positions, fine tuning means on each of said coil means, each of said fine tuning means being movable between a retracted position and an extended position, said fine tuning means when in said retracted position being effective to fine tune the coil means without affecting the switch means, said fine tuning means when in said extended position being effective to open said switch means whenever the coil means associated with said fine tuning means is disposed in said operative position, and means operatively associated with said control circuit means for obtaining an initial energizing of said motor.

13. In combination for tuning a television receiver to any preselected channel in a group of channels, a chassis, a shaft rotatably mounted upon said chassis for revolving about its own axis, separate coil means for each channel, said coil means being circumferentially disposed concentrically about said shaft at substantially equal intervals for rotating with said shaft to operative positions, an electric motor detachably supported by said chassis, means resiliently and detachably connecting said motor to said shaft for rotatably driving said shaft to carry successive ones of said coil means into said operative position, mechanical detent means mounted upon said chassis and positioned to bias one of said coil means into said operative position whenever it is within a predetermined range thereof, first switch means mounted on said chassis and electrically interconnected with said motor and having a first condition for energizing said motor to drive said shaft and coil means and a second condition to deenergize said motor, a plurality of detents carried by said shaft and positioned to engage said switch means and maintain said switch means in said first condition whenever a coil means is not within a predetermined range of said operative position, control circuit means including second switch means having open and closed conditions and operatively interconnected with said motor and said first switch means when closed to energize said motor to drive said shaft, self holding means operatively interconnected with said first switch means and said control circuit means to disable said holding circuit and open said second switch means whenever the first switch means is in said second operative condition and to close said second switch means when said motor is initially energized, means operatively coupled to the motor for initially energizing the motor, and means operatively coupled to said coil means and said first and second switch means for obtaining the second condition of the first and second switch means in the operative position of the coil means.

14. In combination for tuning a television receiver to any preselected channels in a group of channels in response to a command signal from a remote position, a chassis, a shaft rotatably mounted upon said chassis for revolving about its axis in forward and reverse directions, separate coil means for each of the channels in said group, said coil means being carried by said shaft into an operative position wherein one of said coil means at a time is effective to tune said receiver to its respective channel, motor means detachably attached to said chassis, lost motion coupling means operatively and detachably interconnecting said motor means with said shaft so that said motor means may rotatably drive said shaft in the forward and reverse directions in accordance with the operation of the motor means and move a preselected one of said coil means into said operative position, control circuit means including first switch means having operative and inoperative conditions and operatively interconnected with said motor means for maintaining the energizing of said motor means in the operative condition of the first switch means and for changing to the operative condition upon the initial energizing of the motor means, remote control receiver means operatively interconnected with said control circuit means for initially energizing said motor means in response to the command signal to obtain a rotation of the shaft in a particular one of the forward and reverse directions, second switch means having a normally open condition and a closed condition and physically disposed adjacent said coil means and electrically interconnected with said motor means and said first switch means for maintaining the operation of said motor means in the closed condition, a separate detent for each of said coil means and positioned to physically engage said second switch means and close said second switch means only when there are no coil means in said operative position, said switch means when closed being effective to disable said self holding circuit and energize said motor to rotatably drive said shaft until a preselected coil means is in said operative position, and means operatively coupled to said second switch means in the operative condition of said coil means for obtaining the operation of the second switch means to the open condition.

References Cited by the Examiner

UNITED STATES PATENTS

| | | | |
|---|---|---|---|
| 2,773,986 | 12/1956 | Thias et al. | 325—462 X |
| 2,812,486 | 11/1957 | Foster | 318—467 |
| 3,070,736 | 12/1962 | Polley | 318—467 |

KATHLEEN H. CLAFFY, *Primary Examiner.*

WILLIAM C. COOPER, *Examiner.*

R. LINN, *Assistant Examiner.*